(12) United States Patent
Lee et al.

(10) Patent No.: US 8,169,654 B2
(45) Date of Patent: May 1, 2012

(54) SEQUENCING AND REPRODUCING SETS OF TEXT AND GRAPHICS ACROSS A COLLECTION OF PRINTABLE AREAS

(75) Inventors: Robert Paul Lee, Cloverdale, CA (US); Phillip W. McGee, Chino Hills, CA (US); Don Lloyd, Point Reyes Station, CA (US)

(73) Assignee: Avery Dennison Corporation, Pasadena, CA (US)

( * ) Notice: Subject to any disclaimer, the term of this patent is extended or adjusted under 35 U.S.C. 154(b) by 735 days.

(21) Appl. No.: 12/191,077

(22) Filed: Aug. 13, 2008

(65) Prior Publication Data

US 2009/0046324 A1 Feb. 19, 2009

Related U.S. Application Data

(60) Provisional application No. 60/955,969, filed on Aug. 15, 2007.

(51) Int. Cl.
*G06F 15/00* (2006.01)
*B41J 11/44* (2006.01)
(52) U.S. Cl. ......................................... 358/1.18; 400/76
(58) Field of Classification Search .................. 358/1.18, 358/1.13, 1.14, 1.11, 1.16, 1.1; 707/213, 707/802, 999.001, 999.01; 715/764, 246, 715/251, 217, 219, 202; 400/61, 76; 1/1
See application file for complete search history.

(56) References Cited

U.S. PATENT DOCUMENTS 4,484,401 A 11/1984 Pitts
7,117,211 B2 * 10/2006 Whittingham et al. ................ 1/1

FOREIGN PATENT DOCUMENTS

| EP | 0980768 | 2/2000 |
|---|---|---|
| WO | 93/04943 | 3/1993 |
| WO | 96/12618 | 5/1996 |

OTHER PUBLICATIONS

International Search Report and Written Opinion dated Apr. 22, 2009 from corresponding International Application No. PCT/US2008/073147.
Chapter II Demand and Remarks under Article 34 filed on Jul. 22, 2009 from corresponding International Application No. PCT/US2008/073147.
Amendment dated Feb. 22, 2010 from related European Application No. 08 797 882.1.
Office action dated Apr. 19, 2010 from related Mexican Application No. MX/a/2010/001721.
Response dated Jul. 1, 2010 from related Mexican Application No. MX/a/2010/001721.
Office action dated Jul. 21, 2011 from related New Zealand Application No. 583230.
International preliminary examination report dated Feb. 16, 2010 from related International Application No. PCT/US2008/073147.

* cited by examiner

*Primary Examiner* — Saeid Ebrahimi Dehkordy
(74) *Attorney, Agent, or Firm* — Avery Dennison Corporation

(57) ABSTRACT

A method of sequencing and reproducing sets of text and graphics across a collection of printable areas and a computer readable medium having computer-executable instructions for performing the method. The method providing the user the ability to select many variables for the printing of labels for tabs. The method and computer readable medium providing for the creation of divider insert tab labels for the tabs of a set of divider inserts thereby identifying the divided contents. The method and computer printable medium provide for printing of the divider insert tab labels in an order that they are assembled into a binder.

23 Claims, 4 Drawing Sheets

SEQUENCING AND REPRODUCING SETS OF TEXT AND GRAPHICS ACROSS A COLLECTION OF PRINTABLE AREAS

CROSS-REFERENCES TO RELATED APPLICATIONS

This application claims the benefit of U.S. Provisional Application No. 60/955,969, filed Aug. 15, 2007

TECHNICAL FIELD

The present invention generally relates to tabs for divider inserts and, more particularly, to printing printable adhesive labels and insertable divider insert labels for the tabs.

BACKGROUND

Divider inserts are typically used to separate different sections in a binder or other compilation of documents. In a wide range of applications where it may be desirable to identify the division of contents contained within a binder, or the like, divider insert tabs are used. The tab of the divider insert is that portion that extends beyond the non-binding edge of the documents in the binder. Typically the divider inserts have their tab area offset down a set of card inserts that form the divider inserts. The width of the tab depends on how many divider inserts, and thus tabs, are in the set. Typically a separate sheet of printable labels are provided in sizes that match the tab area and number of tabs of the corresponding divider inserts.

One particular identification system for the tabs of divider inserts includes transparent, pre-formed plastic tabs that hold a small insertable label, such as paper or light weight board. Text and/or graphic content are typically printed on the insertable label using, for example, laser or ink jet printers. The insertable label may then be slid into the plastic tab, such that the text and/or graphic are viewable through a portion of the tab, forming a tab label.

Another identification system includes pre-formed tabs which do not allow for the insertion of a paper or board weight insert. Instead, a sheet of die cut adhesive labels may have text and/or graphic content printed on the labels by a laser or ink jet printer. The labels may then be removed from the sheet and applied to the outside of the plastic tab.

Irrespective of whether an adhesive label or an insertable label is used in conjunction with the tab, the order in which the labels are printed on the sheet of adhesive labels or the insertable labels depends largely on how the user plans to assembly his or her binder. The most common feature found in software for handling the printing of labels, and thus the ordering of labels is that of collating and grouping. More specifically, a user may proceed by collating, wherein one binder at a time is completed, each section being done in order. Collating requires the labels to be printed in the correct tab set order and then repeated for each additional binder. However, if a plurality of like binders are being created simultaneously, grouping of the labels would provide that all of the similar labels are printed, prior to moving onto the next label for the next tab in the set. In grouping, one section of divider insert labels at a time across a plurality of binders is accomplished simultaneously. More specifically, if the user is creating one binder at a time, then the labels would be collated whereby the labels are printed and applied to the tabs by sets.

In order to provide collating and grouping, specific information must be encoded in the software template to allow arrangement of the data in these specific orders. In addition, there is a desire to create software templates that do not force the creation of sets wherein every label is unique, also referred to as zero sets. Today, software enablement for these products address the application of text and graphics to the labels, but provide only rudimentary support for printing the labels for the divider insert tabs in an order that is suited to binder assembly.

BRIEF SUMMARY

The present invention provides a method of sequencing and reproducing sets of text and graphics across a collection of printable areas and a computer readable medium having computer-executable instructions for performing the method. The method described herein having been developed to provide the user the ability to select many variables for the printing of labels for divider insert tabs. The method provides for the creation of labels for the tabs of a set of divider inserts thereby identifying the divided contents whereby the printing of the labels is suited to the assembly of the binder, relative to presently used applications and methods.

Other independent features and advantages of the preferred method of sequencing and reproducing sets of text and graphics across a collection of printable areas and a computer readable medium having computer-executable instructions for performing the method will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Disclosed is a method for sequencing and reproducing sets of text and graphics across a collection of printable areas and a computer readable medium having computer-executable instructions for performing the method described herein. The method having been developed to provide the user the ability to select many variables for the printing of labels for tabs. The variables that may be selected include, but are not limited to, the number of sets of labels to be printed at one time depending on the number of tabs found on the set of divider inserts and the choice of collating and grouping to set how the order of the tab set is printed to a label sheet. In addition, with regard to insertable tab labels that are foldable, the method described herein has been developed to provide for the text and graphics printed on the front of the labels, to be matched on the back of the label so that when the user is flipping though a binder the front and back of the tab contains the same information. To create unique labels on adhesive tabs, the method described herein has been developed to provide the user to have a means for printing unique labels, in effect zero sets. In addition, with the convenience of applying a complete set of labels at a single time, the method described herein has been developed to provide the user a means for additionally creating a set of labels for the back of the divider insert tab that can be applied simultaneously. In this case, the second collated set of labels would need to be printed in reverse order. For example, specifying a quantity of 5 sets would then generate ten (10) rows of labels.

Figure 1:
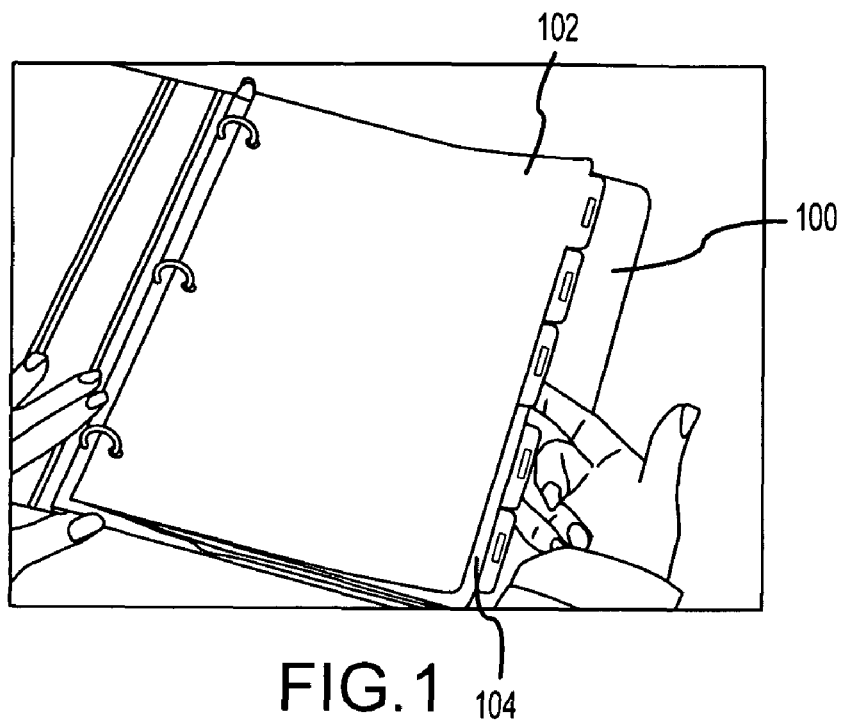
FIG. 1 is a simplified representation of a binder including a plurality of divider inserts according to an exemplary embodiment.
Figure 2:
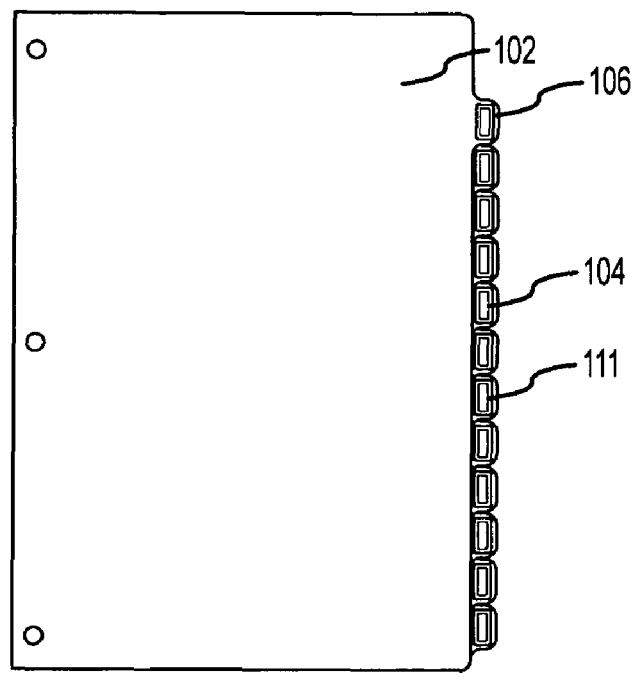
FIG. 2 is a simplified representation of the divider inserts according to an exemplary embodiment.
Figure 5:
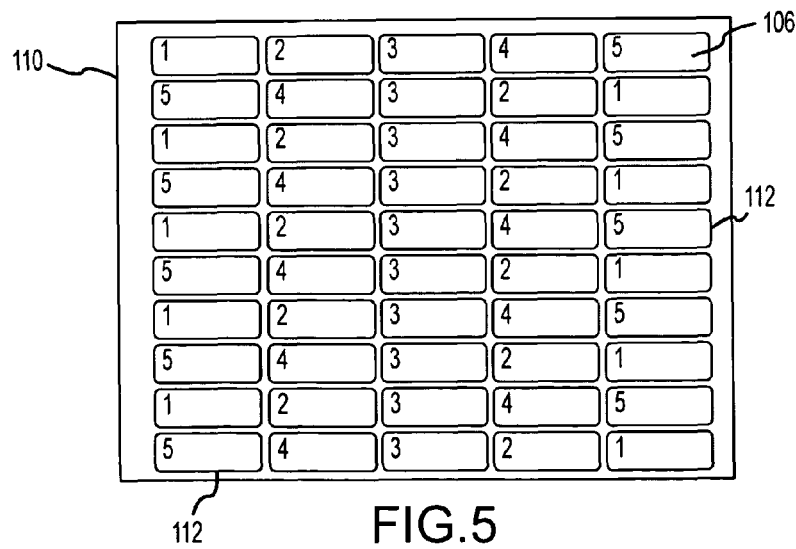
FIG. 5 is a front plan view of a label sheet including a plurality of labels printed in bi-directional collating order according to an exemplary embodiment.
Figure 6:
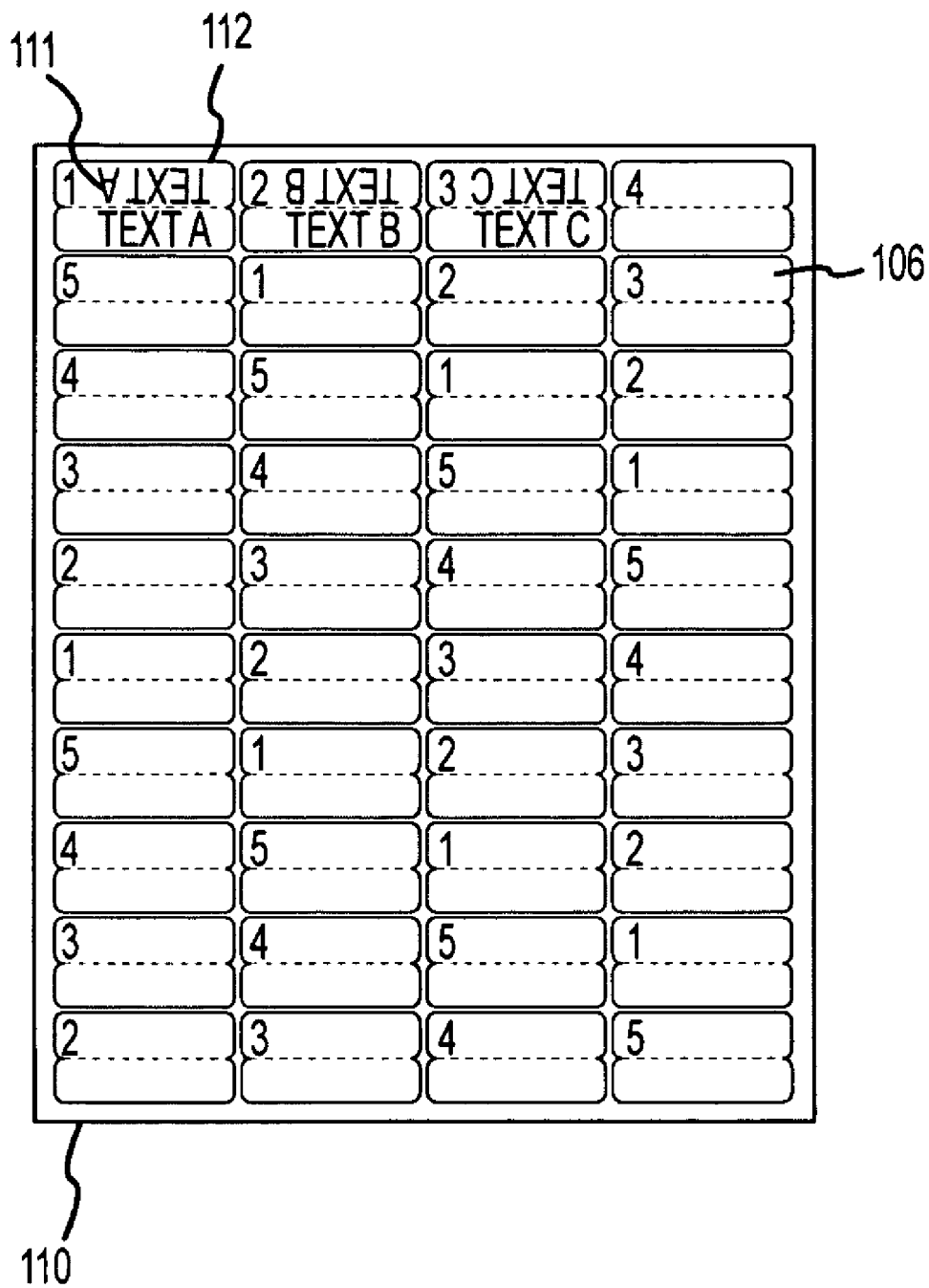
FIG. 6 is a front plan view of a label sheet including a plurality of insertable labels printed in bi-directional collating order according to an exemplary embodiment.

Referring now to FIGS. 1 and 2, illustrated is a binder 100, or similar device configured to contain therein a plurality of divider inserts 102. The divider inserts 102 provide a means for easily dividing the contents contained within the binder 100. The divider inserts 102, as best illustrated in FIG. 2, each include a tab 104 for the purpose of easily identifying the contents contained within each division of the binder 100. More specifically, each tab 104 provides an extended portion onto which a label 106, also referred to herein as a panel, may be applied. Typically, the labels 106 are formed in a set depending upon the number of divider inserts 102, and may be described herein as a "a set of labels" or "a set of panels". Accordingly, described herein are the method for sequencing and reproducing sets of text and graphics across a collection of printable areas and a computer readable medium having computer-executable instructions for performing the method that form the labels 106. More particularly, in creating a set of labels 106 for use on the tabs 104 of a set of divider inserts 102, a user designs a set of text and/or graphics, also referred to herein as a stamp 111, which is then applied onto a grid, namely a label sheet 110 including a plurality of adhesive labels, or a plurality of insertable labels as best illustrated in FIGS. 3-6, defining a label or panel design. In a preferred embodiment, the label sheet 110 includes a plurality of weakened lines 112 defining the labels 106. The weakened lines 112 may be formed as perforations, die cuts or other weakened lines known to those skilled in the art. The labels 106 may be adhesively backed, wherein a release coated liner sheet (not shown) may be included if the adhesive is a pressure sensitive adhesive (PSA), and suitable to adhering to the tabs 104. Alternatively, the labels 106 may be free of adhesive and configured for insertion into slots located at the tabs 104 of the set of divider inserts 102 as best illustrated in FIG. 6. It should be understood that although the labels 106 illustrated in FIG. 6 are formed as dual thickness insertable labels, whereby the labels 106 are folded to allow insertion into slots located on the tabs 104 and expose the printed text, an insertable label of a single thickness is anticipated by this disclosure wherein the text is printed on a front side or on both the front and back side of the label sheet 110 during fabrication.

Figures 3, 4:
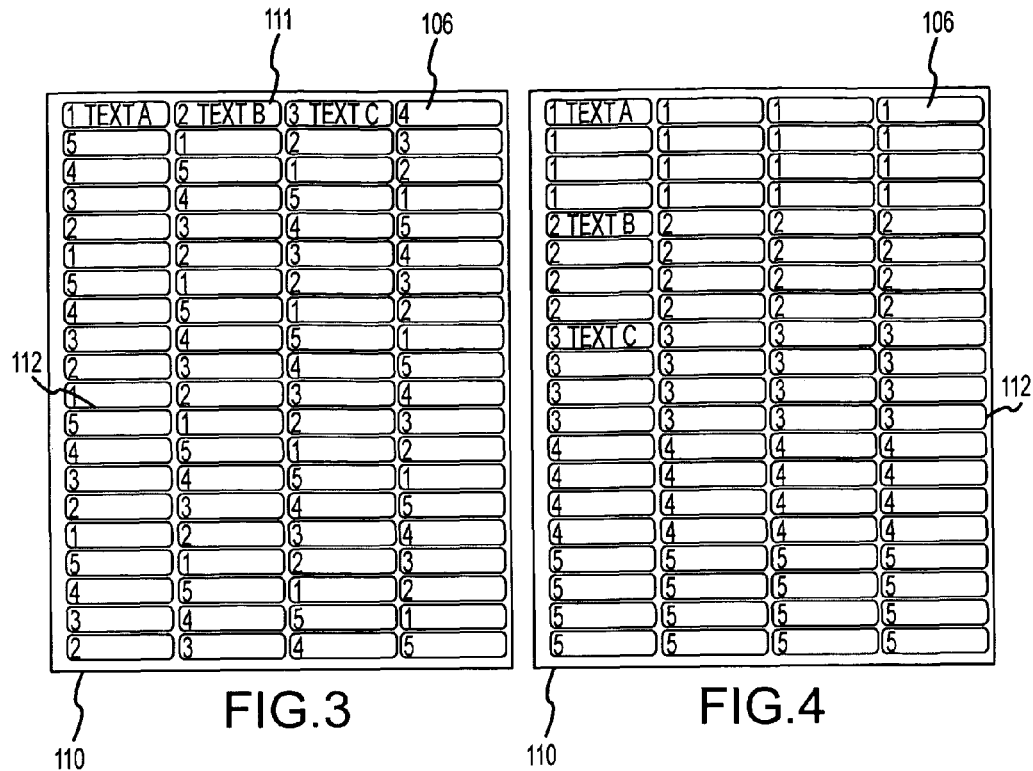
FIG. 3 is a front plan view of a label sheet including a plurality of labels printed in collating order according to an exemplary embodiment.
FIG. 4 is a front plan view of a label sheet including a plurality of labels printed in grouping order according to an exemplary embodiment.

In a preferred embodiment, an algorithm allows a user to define, via a minimum number of variables, the ordering of how the stamp 111 will be applied to a physical page, namely the label sheet 110. Variables may include: (i) collating as best illustrated in FIG. 3 where the labels are printed in order of sequence; (ii) grouping as best illustrated in FIG. 4, where the labels are printed in groups; (iii) bi-directional collating as best illustrated in FIG. 5, wherein the labels are printed in order of sequence and include applying the stamp 111 to the back side of the label, and reversing the order of the stamp 111 for the back side of the label 106; and (iv) bi-directional collating as best illustrated in FIG. 6, wherein the labels are formed as insertable labels printed in order of sequence and include applying the stamp 111 to the back side of the label, and reversing the order of the stamp 111 for the back side of the label 106. The number of settings required from the user is minimal. The computer-executable instructions for performing the method implement logic to make additional settings, virtually eliminating this task by the user.

Figure 7:
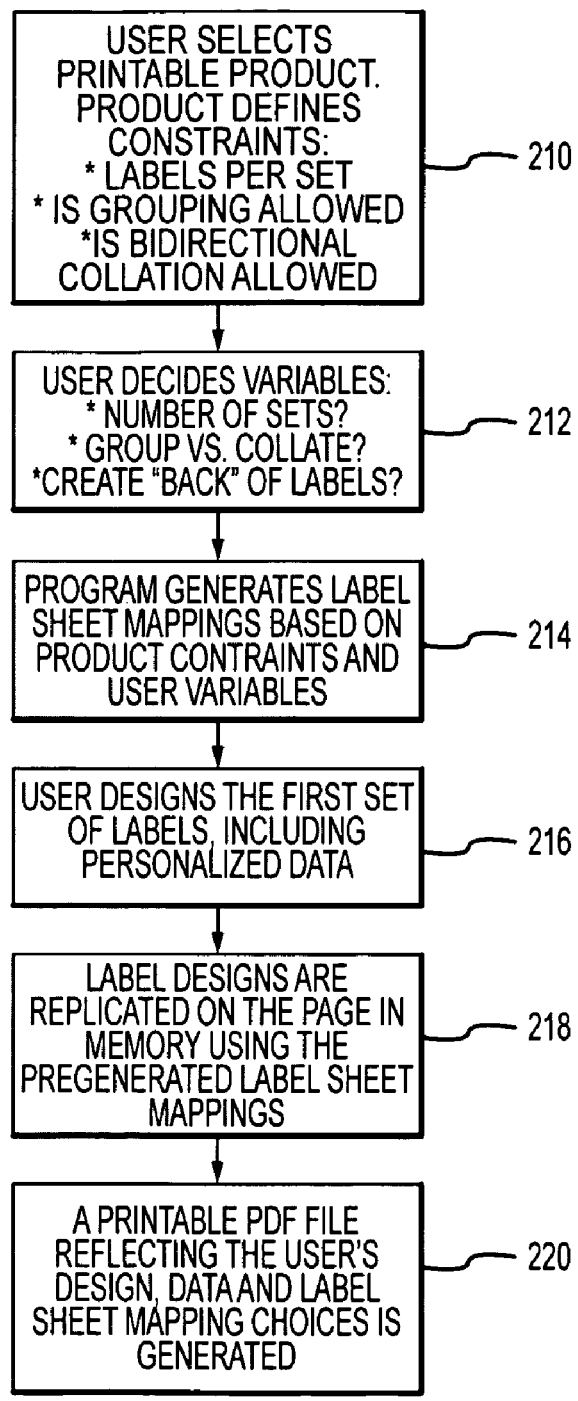
FIG. 7 is a flowchart illustrating a method for replicating a stamp onto a set of replicated elements, such as the labels of the label sheet illustrated in FIG. 2, according to an exemplary embodiment.

To create the set of labels 106 for the tabs 104 of the divider inserts 102, a few simple variables provide an underlying process design method 200 as best illustrated by the flowchart in FIG. 7, for ordering a set of replicated elements, such as the labels 106, onto a grid. Initially, a user selects the printable product 210, for example a printable adhesive label, such as the label 106 of FIGS. 3-6, an insertable divider labels, and more particularly the label sheet 110. The computer-executable instructions define certain constraints which include: the grid (rows and columns), the tab set count, need for grouping, bi-directional collation or reverse order for printing on the backs of the labels 106, automated copying of information printed on the front of the label 106, to the back of the label 106, and the like.

These constraints have applicability to the label sheet 110 chosen, but the total number of labels 106 on the label sheet 110 is not constrained. The computer-executable instructions conveniently apply the constraints to the relevant number of labels 106 on the label sheet 110. This allows the basic template to remain simple and consistent even when different features are applied.

Next, the user selects from various options 212 that are displayed based on the constraints found within the template. These options may include, but are not limited to, the number of sets of labels 106 to print (with the computer-executable instructions able to decide if it is limited to a single label sheet 110 of labels 106), whether to print using collating or grouping, whether to print on the backside of labels 106 if bi-directional collation is supported, or the like.

Next, the computer-executable instructions generate the label sheet mapping 214 based on the template, the constraints and the user-selected variables. The label sheet 110 is in general divided into groups that include a tab quantity equal to the count of the set of divider inserts 102 (FIG. 1-2). Each label 106 is then numbered within each group. For example, with a sheet of 50 labels 106, the template used for a set of 5-tab divider inserts 102 (5-tab set-count constraint), the user can create 10 sets of 5-tabs on one label sheet 110. If the user selects bi-directional collation (when it is supported by the constraints) then the user can only create 5 sets of front-and-back 5-tabs on one label sheet 110.

Lastly, the user inputs the text and/or graphic 216 for the first set of labels 106. The remaining sets of labels are then reproduced from the first set. More specifically, the label sets are replicated 218 by the computer-executable instructions in memory using the pre-generated mappings and then applied to each label position defined in the template. The template, constraints and the user-selected variables in combination create a label sheet 110 for the tabs 104 of the divider inserts 102 in the order the user needs to insert the divider inserts 102 when assembling the binder 100. A printable file, such as a portable document format (pdf) file, reflecting the user's label design and mapping choices is then generated and displayed 220 for approval prior to the actual printing process.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention.

What is claimed is:

1. A method of sequencing and reproducing sets of text and graphics across a collection of printable areas, the method comprising the steps of:
    selecting a printable product sheet including a plurality of divider insert tab labels;
    defining a template by selecting at least one computer-executable instruction defining at least one constraint having applicability to the printable product sheet;
    selecting at least one variable that is displayed based on the at least one constraint found within the template;
    generating a label sheet mapping based on the template, the at least one constraint, and the at least one selected variable;
    dividing the printable product into a plurality of groups, each group including a divider insert tab label quantity equal to a count of a set of divider inserts with which the divider insert tab labels will be associated;
    inputting a stamp for a first group of divider insert tab labels;
    replicating the stamp for each remaining group of the plurality of groups using computer-executable instructions stored in memory;
    generating a label design; and
    printing the stamp onto the plurality of divider insert tab labels using the generated label sheet mapping.

2. The method as claimed in claim 1, further including the step of numbering each divider insert tab label within each of the plurality of groups.

3. The method as claimed in claim 1, wherein the printable product is a divider insert tab label sheet.

4. The method as claimed in claim 1, wherein the label sheet includes a plurality of printable adhesive labels.

5. The method as claimed in claim 1, wherein the label sheet includes a plurality of insertable divider labels.

6. The method as claimed in claim 1, wherein the at least one constraint includes one of a tab set count, grouping, bi-directional collation, reverse order printing on a back side of the printable product, automated copying of information printed on a front side of the printable product to the back of the printable product.

7. The method as claimed in claim 1, wherein the computer-executable instructions apply the constraints to the number of labels on the printable product.

8. The method as claimed in claim 1, wherein the at least one displayed variable includes at least one of the number of sets of labels to print, whether to print using collating, whether to print using grouping, and whether to print on the back side of labels when bi-directional collation is supported.

9. The method as claimed in claim 1, further including the step of generating a printable file including the generated label design and mapping choices.

10. The method as claimed in claim 9, wherein the printable file is in a portable document format (pdf) file format.

11. A non transitory computer readable medium having computer-executable instructions for sequencing and reproducing sets of text and graphics across a collection of printable areas by instructing a computer to perform the steps of:
    defining a template by selecting at least one computer-executable instruction defining at least one constraint having applicability to a printable product including a plurality of divider insert tab labels;
    displaying a plurality of variables for selection by a user based on the constraints found within the template;
    generating a label sheet mapping based on the template, the at least one constraint and at least one variable selected by the user;
    dividing the printable product into a plurality of groups, each group including a divider insert tab label quantity equal to a count of a set of divider inserts with which the divider insert tab labels will be associated;
    receiving a stamp input by a user for a first group of divider insert tab labels;
    replicating the stamp for each remaining group of the plurality of groups using computer-executable instructions stored in memory; and
    printing the plurality of divider insert tab labels using the generated label sheet mapping.

12. The computer readable medium as claimed in claim 11, further including the step of numbering each divider insert tab label within each of the plurality of groups.

13. The computer readable medium as claimed in claim 11, wherein the printable product is a divider insert tab label sheet.

14. The computer readable medium as claimed in claim 11, wherein the label sheet includes a plurality of printable adhesive labels.

15. The computer readable medium as claimed in claim 11, wherein the label sheet includes a plurality of insertable divider labels.

16. The computer readable medium as claimed in claim 11, wherein the at least one constraint includes one of a tab set count, grouping, bidirectional collation, reverse order printing on a back side of the printable product, automated copying of information printed on a front side of the printable product to the back of the printable product.

17. The computer readable medium as claimed in claim 11, wherein the computer-executable instructions apply the constraints to the number of labels on the printable product.

18. The computer readable medium as claimed in claim 11, wherein the at least one displayed variable includes at least one of the number of sets of labels to print, whether to print using collating, whether to print using grouping, whether to print on the back side of labels when bi-directional collation is supported.

19. The computer readable medium as claimed in claim 11, further including the step of generating a printable file including the generated label design and mapping choices.

20. The computer readable medium as claimed in claim 19, wherein the printable file is in a portable document format (pdf) file format.

21. A non transitory computer readable medium having computer-executable instructions for sequencing and reproducing sets of text and graphics across a collection of printable areas by instructing a computer to perform the steps of:

defining a template by selecting at least one computer-executable instruction defining at least one constraint having applicability to a printable product including a plurality of divider insert tab labels, wherein the at least one constraint includes one of a tab set count, grouping, bi-directional collation, reverse order printing on a back side of the printable product, automated copying of information printed on a front side of the printable product to the back of the printable product;

displaying at least one variable for selection by a user based on the constraints found within the template, the at least one variable including at least one of the number of sets of labels to print, whether to print using collating, whether to print using grouping, whether to print on the back side of the divider insert tab labels when bi-directional collation is supported;

generating a label sheet mapping based on the template, the at least one constraint and at least one variable selected by the user;

dividing the printable product into a plurality of groups, each group including a divider insert tab label quantity equal to a count of a set of divider inserts with which the divider insert tab labels will be associated;

receiving text input by a user for a first group of divider insert tab labels;

replicating the text for each remaining group of the plurality of groups using computer-executable instructions stored in memory; and printing the plurality of divider insert tab labels using the generated label sheet mapping.

22. The computer readable medium as claimed in claim 21, further including the step of numbering each divider insert tab label within each of the plurality of groups.

23. The computer readable medium as claimed in claim 21, further including the step of generating a printable file including the generated label design and mapping choices, wherein the printable file is in a portable document format (pdf) file format.

* * * * *